C. D. RAWSON.
Spring Bed-Bottom.

No. 163,106. Patented May 11, 1875.

Witnesses
Chas R Stilwell
P West

Inventor
C D Rawson

UNITED STATES PATENT OFFICE.

CHANDLER D. RAWSON, OF WORCESTER, MASSACHUSETTS.

IMPROVEMENT IN SPRING BED-BOTTOMS.

Specification forming part of Letters Patent No. 163,106, dated May 11, 1875; application filed October 7, 1874.

*To all whom it may concern:*

Be it known that I, CHANDLER D. RAWSON, of Worcester, in the county of Worcester and State of Massachusetts, have invented a new and useful Improvement in Spring Bed-Bottoms; and I do hereby declare the following to be a full, clear, and exact description thereof, which will enable those skilled in the art to make and use the same, reference being had to the accompanying drawings forming part of this specification.

Figure 1:
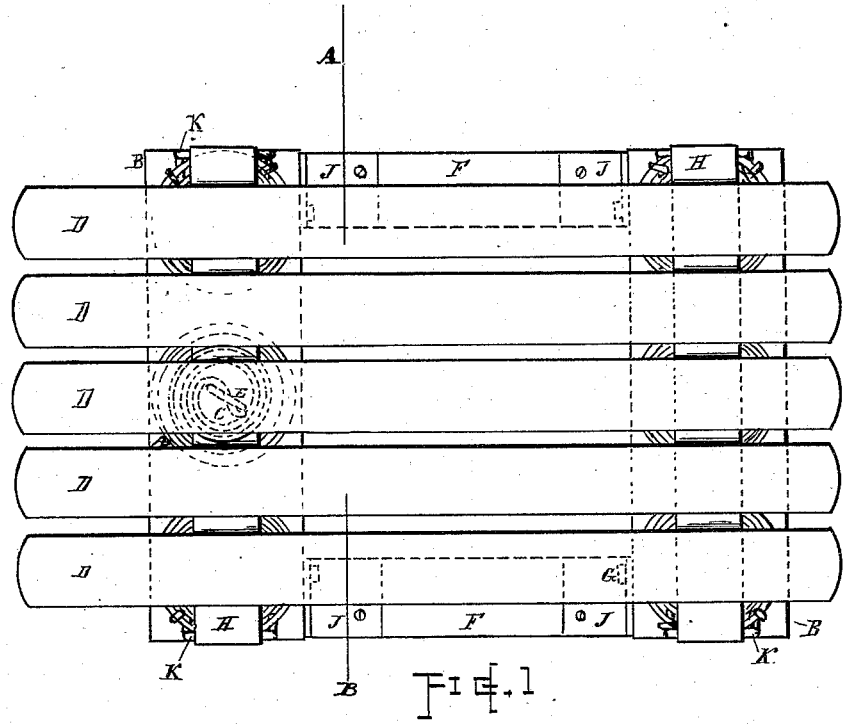
Figure 2:
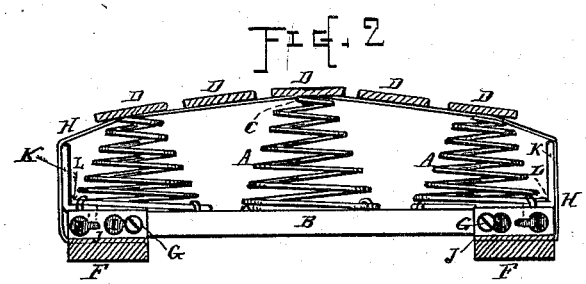
Figure 3:
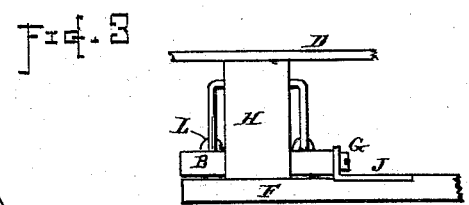
Figure 4:
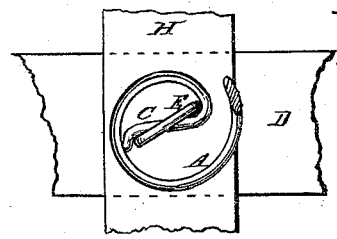

Figure 1 represents a plan view; Fig. 2, transverse section at line A B, Fig. 1. Fig. 3 is an elevation of the end spring; Fig. 4, bottom view of spring attachment to the slats.

In this bed-bottom I use two series or rows of conical coiled springs, A, whose bases rest upon two supporting-bars, B B. These springs are connected at their upper ends to the slats D by means of hooks C of sigmoidal shape, which engage with staples E on the under sides of the slats D, in the manner shown clearly in Fig. 4. A firm connection is thus secured between the springs and the slats, and yet they can be readily separated when required. The slats are connected by webbing H, passing between the slats and springs, and attached at its ends to the cross-bars F, as shown in Fig. 2. The cross-bars are attached to the supporting-bars B by means of angle-irons J and screws or bolts G, the irons being provided with a number of slots, I, of the shape shown, which, at their largest ends, receive the heads of the screws G, and embrace their shanks at their narrower part. By changing the screws G from one slot to another the webbing H can be readily tightened, and by slipping the slot at its larger end off the screw-head, the cross-bars F can be instantly disconnected from the supporting-bars. At or near each end of the supporting-bars B B is located a strong spring, K, to support the webbing H at those points. This spring is formed of stout wire, and has the shape shown in Fig. 3. At its lower end is a shoulder projecting at right angles, and resting upon the supporting-bars, and against the lower coil of the end conical springs. It gives the webbing ample and firm support.

What I claim, and desire to secure by Letters Patent, is—

The combination of the supporting-bars B B, cross-bars F F, angle-irons J, having the slots I, and headed screws or bolts G, with the adjustable webbing H, supported by springs A and K, and sustaining the slats D, all in the manner and for the purpose specified.

C. D. RAWSON.

Witnesses:
S. A. GROSVENOR,
CALEB KENDALL.